(12) United States Patent
Choi et al.

(10) Patent No.: US 11,218,703 B2
(45) Date of Patent: *Jan. 4, 2022

(54) SYSTEMS AND METHODS FOR ADAPTIVELY ENCODING VIDEO STREAM

(71) Applicant: fuboTV Media Inc., New York, NY (US)

(72) Inventors: Sung Ho Choi, New York, NY (US); Thomas Symborski, New York, NY (US); Matthew Tretin, New York, NY (US)

(73) Assignee: FuboTV Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,481

(22) Filed: Sep. 20, 2019

(65) Prior Publication Data

US 2020/0092562 A1    Mar. 19, 2020

Related U.S. Application Data

(63) Continuation of application No. 15/997,388, filed on Jun. 4, 2018, now Pat. No. 10,440,367.

(51) Int. Cl.
*H04N 11/02* (2006.01)
*H04N 19/146* (2014.01)
(Continued)

(52) U.S. Cl.
CPC .......... *H04N 19/146* (2014.11); *H04N 19/12* (2014.11); *H04N 19/184* (2014.11); *H04N 19/40* (2014.11); *H04N 21/2343* (2013.01); *H04N 21/23439* (2013.01); *H04N 21/24* (2013.01); *H04N 21/25841* (2013.01); *H04N 21/25858* (2013.01); *H04N 21/25883* (2013.01); *H04N 21/25891* (2013.01); *H04N 21/2662* (2013.01); *H04N 21/4402* (2013.01); *H04N 21/44029* (2013.01); *H04N 21/44209* (2013.01); *H04N 21/44213* (2013.01); *H04N 21/4532* (2013.01); *H04N 21/4621* (2013.01); *H04N 21/6582* (2013.01); *H04N 21/8456* (2013.01); *H04N 19/70* (2014.11); *H04N 21/234309* (2013.01); *H04N 21/440218* (2013.01)

(58) Field of Classification Search
CPC ..................................... H04N 19/146
USPC ........................ 375/240.01–240.29
See application file for complete search history.

(56) References Cited

U.S. PATENT DOCUMENTS 7,155,462 B1    12/2006  Singh et al.
8,122,477 B1 *   2/2012  Stepanian ........ H04N 21/23106
                                                  725/91

(Continued)

*Primary Examiner* — Leron Beck
(74) *Attorney, Agent, or Firm* — BakerHostetler

(57) ABSTRACT

The disclosed technology relates to adaptively encoding a video stream based on viewer engagement, content schedule and/or content characteristics. A system routes a video stream from a signal extractor to a first virtual encoder. The first virtual encoder is instantiated on a cloud platform and provides a first video output at a first bitrate. A second virtual encoder is instantiated on the cloud platform in response to a change in viewer count. The system routes the video stream from the signal extractor to the second virtual encoder. The second virtual encoder provides a second video output at a second bitrate. The second bitrate is different from the first bitrate.

20 Claims, 6 Drawing Sheets

(51) Int. Cl.

| | |
|---|---|
| *H04N 19/12* | (2014.01) |
| *H04N 19/184* | (2014.01) |
| *H04N 19/40* | (2014.01) |
| *H04N 21/2662* | (2011.01) |
| *H04N 21/462* | (2011.01) |
| *H04N 21/442* | (2011.01) |
| *H04N 21/24* | (2011.01) |
| *H04N 21/2343* | (2011.01) |
| *H04N 21/258* | (2011.01) |
| *H04N 21/4402* | (2011.01) |
| *H04N 21/845* | (2011.01) |
| *H04N 21/45* | (2011.01) |
| *H04N 21/658* | (2011.01) |
| *H04N 19/70* | (2014.01) |

(56) References Cited

U.S. PATENT DOCUMENTS

| | | | |
|---|---|---|---|
| 8,813,116 B2 | 8/2014 | Tam | |
| 9,047,568 B1* | 6/2015 | Fisher | G06N 3/0472 |
| 9,338,523 B2* | 5/2016 | Owen | G06F 3/165 |
| 9,600,381 B2 | 3/2017 | Ball et al. | |
| 2002/0077880 A1* | 6/2002 | Gordon | H04N 21/6581 |
| | | | 705/7.33 |
| 2005/0074063 A1* | 4/2005 | Nair | H04N 19/172 |
| | | | 375/240.11 |
| 2008/0095450 A1* | 4/2008 | Kirenko | H04N 19/36 |
| | | | 382/232 |
| 2010/0189179 A1* | 7/2010 | Gu | H04N 19/176 |
| | | | 375/240.16 |
| 2012/0147958 A1* | 6/2012 | Ronca | H04N 19/14 |
| | | | 375/240.16 |
| 2012/0191805 A1 | 7/2012 | Fee et al. | |
| 2013/0023340 A1 | 1/2013 | Lee et al. | |
| 2013/0117563 A1 | 5/2013 | Grabelkovsky | |
| 2013/0128947 A1 | 5/2013 | Fryer et al. | |
| 2013/0160048 A1 | 6/2013 | Cho et al. | |
| 2013/0212228 A1* | 8/2013 | Butler | G06T 11/60 |
| | | | 709/219 |
| 2014/0006580 A1 | 1/2014 | Raghu | |
| 2014/0074911 A1 | 3/2014 | Park et al. | |
| 2015/0113100 A1 | 4/2015 | Tweedale et al. | |
| 2016/0088050 A1 | 3/2016 | Einarsson | |
| 2016/0134881 A1* | 5/2016 | Wang | H04L 65/607 |
| | | | 375/240.02 |
| 2016/0301960 A1 | 10/2016 | Sze et al. | |
| 2018/0063590 A1* | 3/2018 | Her | H04N 21/8146 |
| 2018/0219926 A1* | 8/2018 | Ziskin | H04L 65/602 |
| 2018/0359538 A1* | 12/2018 | Good | H04L 65/605 |

* cited by examiner

SYSTEMS AND METHODS FOR ADAPTIVELY ENCODING VIDEO STREAM

CROSS REFERENCE TO RELATED APPLICATIONS

The present application is a continuation of U.S. patent application Ser. No. 15/997,388, entitled "SYSTEMS AND METHODS FOR ADAPTIVELY ENCODING VIDEO STREAM," filed Jun. 4, 2018, the content of which is incorporated herein by reference in its entirety.

TECHNICAL FIELD

This present disclosure relates generally to systems and methods for encoding a video stream, and more particularly to adaptively encoding a video stream based on viewer engagement, content schedule and/or content characteristics.

BACKGROUND

Transmission of video content (e.g., video, audio, collectively or individually referred to herein also as content) to numerous households, users, or clients on a network may require significant processing resources, particularly where real-time viewing of content is desired. In such applications, low latency and reliable transmission are critical to enable the best possible viewing experience.

SUMMARY

One aspect of the present disclosure relates to a method for providing adaptive video encoding. The method may include routing a video stream from a signal extractor to a first virtual encoder. The first virtual encoder may be instantiated on a cloud platform and configured to provide a first video output at a first bitrate. The method may include instantiating a second virtual encoder on the cloud platform in response to at least one of a change in viewer count, a schedule of content associated with the video stream, and a characteristic of content associated with the video stream. The method may include routing the video stream from the signal extractor to the second virtual encoder. The second virtual encoder may be configured to provide a second video output at a second bitrate. The second bitrate may be different from the first bitrate.

Another aspect of the present disclosure relates to a non-transient computer-readable storage medium having instructions embodied thereon, the instructions being executable by one or more processors to perform a method for providing adaptive video encoding. The method may include routing a video stream from a signal extractor to a first virtual encoder. The first virtual encoder may be instantiated on a cloud platform and configured to provide a first video output at a first bitrate. The method may include instantiating a second virtual encoder on the cloud platform in response to at least one of a change in viewer count, a schedule of content associated with the video stream, and a characteristic of content associated with the video stream. The method may include routing the video stream from the signal extractor to the second virtual encoder. The second virtual encoder may be configured to provide a second video output at a second bitrate. The second bitrate may be different from the first bitrate.

Yet another aspect of the present disclosure relates to a system configured for providing adaptive video encoding. The system may include one or more hardware processors configured by machine-readable instructions. The processor(s) may be configured to route a video stream from a signal extractor to a first virtual encoder. The first virtual encoder may be instantiated on a cloud platform and configured to provide a first video output at a first bitrate. The processor(s) may be configured to instantiate a second virtual encoder on the cloud platform in response to at least one of a change in viewer count, a schedule of content associated with the video stream, and a characteristic of content associated with the video stream. The processor(s) may be configured to route the video stream from the signal extractor to the second virtual encoder. The second virtual encoder may be configured to provide a second video output at a second bitrate. The second bitrate may be different from the first bitrate.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
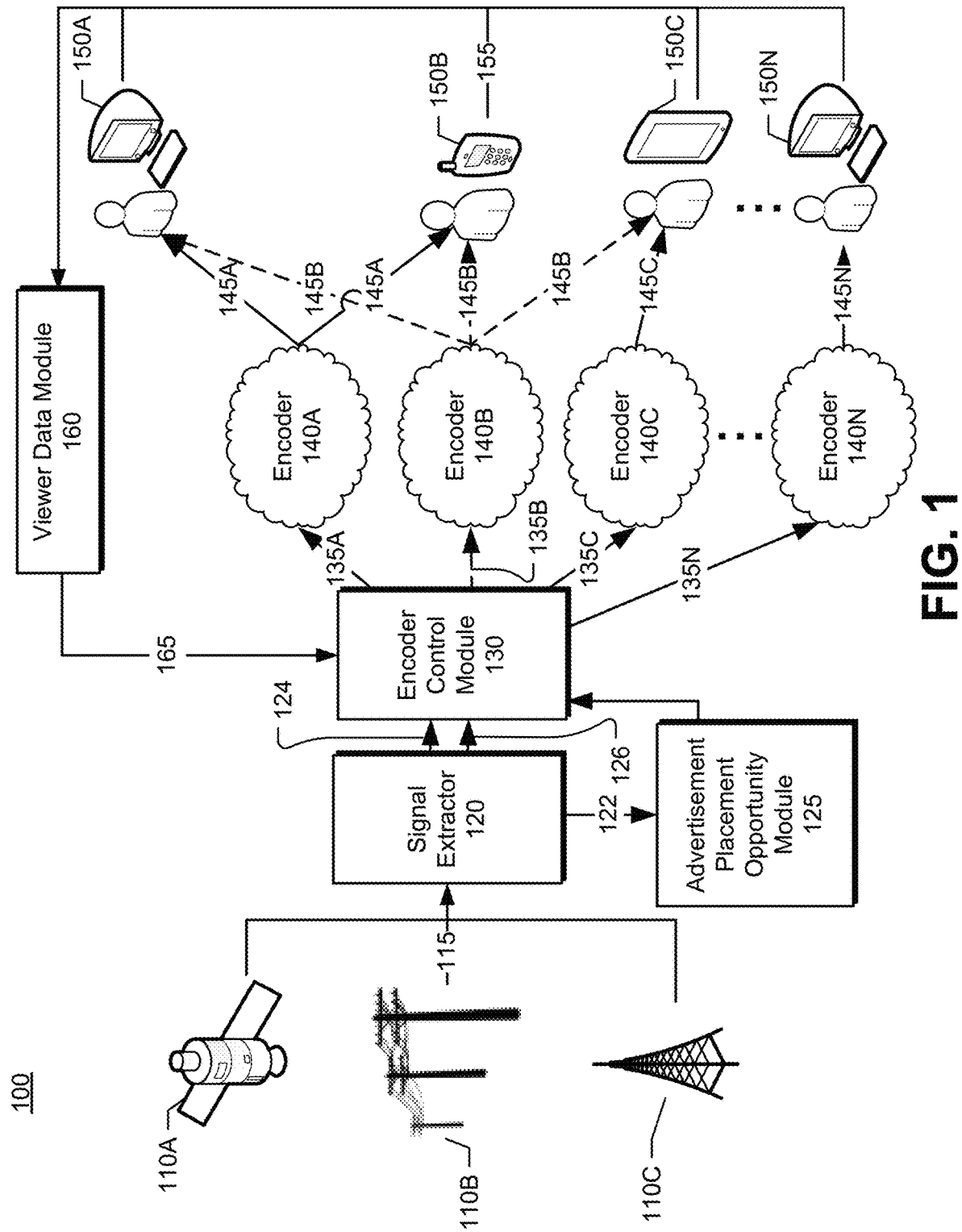
FIG. 1 is a conceptual block diagram illustrating an example system for providing adaptive video encoding, in accordance with various aspects of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Content (e.g., video data) may exist in different video formats such as "MOV," "FLV," "MP4," and WMV— among others. Because different client devices or software (e.g., mobile devices, computers, televisions, Internet browsers), may have different specifications and requirements, it is necessary to encode or convert (e.g., video encoding, transcoding) the content from one format to another depending on the client device or software.

In the context of video programming distributors that deliver content, video encoding is conventionally done in-house using a distributor's infrastructure, which may include dedicated server farms, video encoding software, and IT personnel. Traditional encoding schemes are expensive, often requiring significant investment in hardware, training, and maintenance. Video encoding software must be continuously updated for performance and security, and IT personnel must run and monitor heavy video encoding processes. In addition, traditional encoding schemes are designed for peak utilization, that is, distributors must design their systems with sufficient video encoding capacity (e.g., server resources or capacity) to adequately serve customers during high-demand periods. To design for peak utilization, a sufficient number of servers are acquired, purchased or otherwise obtained, and are readied for use when needed. When not used, these same servers require ongoing maintenance and running expenditures associated with floor space used, electricity, and personnel.

Accordingly, there is a need for certain embodiments of an intelligent and dynamic scalable and adaptive encoding system to address these and/or other issues.

The disclosed technology addresses the foregoing limitations of conventional encoder schemes by providing systems and methods for spinning-up or disconnecting virtual encoding devices based on actual or predicted changes in viewership demographics (e.g., viewer counts, geography, etc.).

In some implementations, decreasing viewer counts can trigger the instantiation of additional (container-based) encoding devices, for example, that are configured to provide reduced encoding rates as compared to a primary encoder, e.g., to more economically encode video streams for limited/decreasing numbers of viewers. Newly instantiated encoders can be concurrently implemented with the primary encoder in order to ensure adequate streaming quality and continuity before encoder substitutions are fully finalized. In such instances, video signals provided to the primary encoder may be redirected to the newly instantiated encoder(s), and used to provide streaming video to an increasing subset of viewers. Once all viewers have been successfully transitioned to the newly instantiated encoding device(s), the primary (high-rate) encoder can be disconnected to realize the cost savings of reduced computing consumption.

In other implementations, additional encoders may be required to provide high-rate encoding, for example, where increased video stream resolutions are desired for an increasing number of viewers. In such implementations, detected increases in viewer count can trigger the instantiation of additional encoders that are executed concurrently with a primary (relatively lower-rate) encoder. Similar to the above example, transitioning of viewers to thereby receive streaming video from the newly instantiated encoder(s) can be gradual. That is, increasing subsets of viewers can be provided video streams sourced from the new encoder(s) as video quality and continuity is verified.

FIG. 1 illustrates a conceptual block diagram illustrating an example system 100 for providing adaptive video encoding, in accordance with various aspects of the subject technology. Various aspects are discussed with respect to a general wide area network for illustrative purposes, however, these aspects and others may be applied to other types of networks. For example, a network environment may be implemented by any type of network and may include, for example, any one or more of an enterprise private network (EPN), cellular network, a satellite network, a personal area network (PAN), a local area network (LAN), a broadband network (BBN), or a network of public and/or private networks, such as the Internet, or the like. The system 100 may be implemented using any number of communications links associated with one or more service providers, including one or more wired communication links, one or more wireless communication links, or any combination thereof. Additionally, the system 100 can be configured to support the transmission of data formatted using any number of protocols.

The system 100 includes one or more clients 150A-N. The clients 150A-N may include machines (e.g., servers, personal computers, laptops), virtual machines, containers, mobile devices (e.g., tablets or smart phones), or smart devices (e.g., set top boxes, smart appliances, smart televisions, internet-of-things devices). The clients 150A-N may utilize software applications, browsers, or computer programs that are running on a device such as a desktop computer, laptop computer, tablet computer, server computer, smartphone, or any other apparatus on which an application (e.g., client application) is running that at some point in time, involves a user accessing content and streaming video provided by the system 100. In one aspect, the clients 110A-N may operate pursuant to the port control protocol (PCP) to control how data (e.g., packets) are handled to provide for the data flow of content and streaming video to the clients 150A-N. Other protocols for provisioning data flow to the clients 150A-N may also be used.

The system 100 includes one or more incoming signals 115, a signal extractor 120, an encoder control module 130, one or more cloud-based encoders 140A-N, one or more client devices 150A-N, and a viewer data module 160. In one aspect, the system 100 may include additional components, fewer components, or alternative components, such as additional encoders, different networks for different clients, and/or additional third-party servers. The system 100 may include additional components, such as routers or firewalls. The system 100 may be implemented as a single machine or distributed across a number of machines in a network, and may comprise one or more servers.

The devices (e.g., signal extractor 120, advertisement placement opportunity module 125, encoder control module 130, cloud-based encoders 140A-N, client devices 150A-N, viewer data module 160) may be connected over links through ports. Any number of ports and links may be used. The ports and links may use the same or different media for communications. Wireless, microwave, wired, Ethernet, digital subscriber lines (DSL), telephone lines, T1 lines, T3 lines, satellite, fiber optics, cable and/or other links may be used.

According to the subject technology disclosed herein, the incoming signal 115 originates from a remote content source or provider and may be transmitted or broadcasted to the signal extractor 120 by a data link, such as for example, a satellite 110A, a terrestrial fiber cable 110B, and/or an antenna 110C. The incoming signal 115 from each remote content source may comprise a compressed video signal.

The incoming signal 115 may, for example, be compressed using a video encoder that may be a device or program that compresses data to enable faster transmission. The video encoder may compress the data into one or more video compression formats, such as H.265, H.264, MPEG-H, MPEG-4, and/or MPEG-2. The incoming signal 115 may contain video data representing programming and advertisements (e.g., content). The incoming signal 115, may further include markers that delimit the advertisements to enable replacement or insertion of a particular advertisement within the programming (e.g., local advertisement insertion opportunity), scheduling information, and/or data representing one or more characteristics of the content associated with the programming. In one aspect, the markers, scheduling information, and/or content characteristics, may comply with certain standards, such as the SCTE-35 standard.

The incoming signals 115 are received at the signal extractor 120. The signal extractor 120 may be configured to extract data, such as metadata representing the markers, scheduling, content characteristics, and/or the SCTE-35 information. In one aspect, the signal extractor 120 may be configured to communicate with an advertisement placement opportunity module 125 to provide the extracted marker 122 or SCTE-35 information to the advertisement placement opportunity module 125. The advertisement placement opportunity module 125 may be configured to use the marker 122 or SCTE-35 information to identify targeted advertising opportunities. The signal extractor 120 may comprise servers, routers, switches, or other network devices for extracting marker, scheduling, content characteristics, and/or the SCTE-35 information from the incoming signal 115; and for routing or forwarding the incoming signal 115 and data components thereof, to the encoder control module 130.

The signal extractor 120 may route or forward the data in the incoming signal 115 representing programming and/or advertisements (video data 124) to the encoder control module 130. The signal extractor 120 may also route or forward the data in the incoming signal 115 representing the markers, scheduling, content characteristics, and/or the SCTE-35 information (management data 126) to the encoder control module 130. The signal extractor 120 may alternatively route or forward the incoming signal 115 to the encoder control module 130.

In one aspect, the encoder control module 130 may be configured to communicate with a plurality of cloud-based encoders 140A-N (e.g., via a cloud platform), the viewer data module 160, and the advertisement placement opportunity module 125. In particular, the encoder control module 130 is configured to communicate with each cloud-based encoder 140A-N to intelligently instantiate and/or disconnect individual cloud-based encoders 140A-N based on changing viewership demographics, content schedule, or one or more content characteristics. For example, as discussed further below, the encoder control module 130 may utilize data representing viewership demographics 165 (e.g., viewer count, geography, paid service tier, device type) received from the viewer data module 160 to accomplish adaptive encoding based on detected or real-time changes in viewership demographics. In another example, the encoder control module 130 may utilize past data of viewership demographics 165 to accomplish adaptive encoding based on predicted changes in future viewership demographics. In yet another example, the encoder control module 130 may utilize content schedule information that may be derived from the management data 126 to accomplish adaptive encoding based on, for example, start time of content, duration of content, end time of content, channel, and/or actual or predicted system demand, such as demands or system loads that may be caused by concurrent broadcasting of high-demand content (e.g., significant sporting event, award show, etc.). In yet another example, the encoder control module 130 may utilize one or more content characteristics that may be derived from the management data 126 to accomplish adaptive encoding based on the type of content (e.g., sporting event, awards show, sitcom, news show, documentary, pilot, animation, game show, legal drama, late night television, music television, cooking show, children's series daytime television, prime-time television, religious, science fiction, comedy, infomercial, variety show, or western), content rating, popularity, type of sporting event, content format (e.g., standard definition, high definition, 4K), liveness (e.g., whether content is a "live" broadcast).

The encoder control module 130 may be configured to initiate a session with one or more cloud-based encoders 140A-N, validate a connection with a particular cloud-based encoder 140A-N, route video data 135A-N (e.g., video stream) or the incoming signal 115 (e.g., video stream) to an individual cloud-based encoder 140A-N (e.g., virtual encoder), assess the quality of encoded video produced by a particular cloud-based encoder 140A-N, and disconnect or otherwise terminate a session with a particular cloud-based encoder 140A-N. The encoder control module 130 can include various physical network devices (e.g., servers, routers, or switches, etc.) or virtual network devices (e.g., that are instantiated as containers or virtual machines) for initiating and terminating session with one or more cloud-based encoders 140A-N, validating connections with one or more cloud-based encoders 140A-N, and/or routing video streams to one or more cloud-based encoders 140A-N.

Additionally, encoder control module 130 may include electronic storage, one or more processors, and/or other components. The encoder control module 130 may include communication lines, or ports to enable the exchange of information with a network and/or other computing platforms. Illustration of the encoder control module 130 in FIG. 1 is not intended to be limiting. The encoder control module 130 may include a plurality of hardware, software, and/or firmware components operating together to provide the functionality attributed herein to the encoder control module 130. For example, encoder control module 130 may be implemented by a cloud of computing platforms operating together as the encoder control module 130.

In some aspects, the video data 135A-N may include instructions or commands directed to a particular encoder 140A-N to instruct the encoder 140A-N to initiate or terminate a session. Alternatively, the instructions or commands may be separately transmitted to individual cloud-based encoders 140A-N. The video data 135A-N may also include the video stream from the incoming signal 115.

In some aspects, the cloud-based encoders 140A-N are each configured to receive the video data 135A-N or the incoming signal 115 from the encoder control module 130 and output encoded video data 145A-N (e.g., video stream encoded in various resolutions and bitrates). The encoded video data 145A-N output by each cloud-based encoder 140A-N may comprise encoded segments of the content associated with the video stream, provided in several versions—where each version provides the content at a different resolution and bitrate (e.g., profiles). In one aspect, each cloud-based encoder 140A-N may be configured to decode, encode, and/or transcode the video data 135A-N or the incoming signal 115 using one or more video compression formats, such as H.265, H.264, MPEG-H, MPEG-4, and/or MPEG-2.

For example, referring to FIG. 1, for video data 135A comprising a video stream of content provided at a video resolution of 1080p (1920×1080), a bitrate of about 50 Mbps, and compressed using the MPEG-2 standard, the cloud-based encoder 140A may be instructed by the encoder control module 130 to transcode or convert the video data 135A into encoded video data 145A (e.g., video stream encoded in various resolutions and bitrates). Encoded video data 145A may comprise a plurality of profiles that include a first profile having a resolution of 1080p (1920×1080) and bitrate of about 2-6 Mbps, a second profile having a resolution of 720p (1280×720) and bitrate of about 0.9-3 Mbps, a third profile having a resolution of 576p (1024×576) and bitrate of about 0.6-2 Mbps, a fourth profile having a resolution of 480p (848×480) and bitrate of about 0.4-1.5 Mbps, a fifth profile having a resolution of 432p (768×432) and bitrate of about 0.3-1.3 Mbps, a sixth profile having a resolution of 360p (640×360) and bitrate of about 0.2-1 Mbps, and a seventh profile having a resolution of 240p (424×240) and bitrate of about 0.1-0.7 Mbps, using the H.264 standard.

Continuing with the example shown in FIG. 1, the cloud-based encoder 140B may receive video data 135B from the encoder control module 130. The encoder 140B may be instructed by the encoder control module 130 to transcode or convert the video data 135B into encoded video data 145B (e.g., video stream encoded in various resolutions and bitrates). Encoded video data 145B may comprise a plurality of profiles that include a first profile having a resolution of 480p (848×480) and bitrate of about 0.4-1.5 Mbps, a second profile having a resolution of 360p (640×360) and bitrate of about 0.2-1 Mbps, and a third profile having a resolution of 240p (424×240) and bitrate of about 0.1-0.7 Mbps, using the H.264 standard. The profiles generated by the encoder 140B may be different from the profiles generated by the encoder 140A. For example, encoder 140B does not generate profiles having resolutions of 1080p, 720p, 576p, or 432p, whereas encoder 140A does generate profiles having resolutions of 1080p, 720p, 576p, and 432p. As such, the resolutions and bitrates generated by the encoder 140B and the encoder 140A may vary from each other and may not be the same.

Continuing with the example shown in FIG. 1, the cloud-based encoder 140C may receive video data 135C from the encoder control module 130. The encoder 140C may be instructed by the encoder control module 130 to transcode or convert the video data 135C into encoded video data 145C (e.g., video stream encoded in various resolutions and bitrates). Encoded video data 145C may comprise a plurality of profiles that include a first profile having a resolution of 720p (1280×720) and bitrate of about 0.9-3 Mbps, a second profile having a resolution of 480p (848×480) and bitrate of about 0.4-1.5 Mbps, a third profile having a resolution of 360p (640×360) and bitrate of about 0.2-1 Mbps, and a fourth profile having a resolution of 240p (424×240) and bitrate of about 0.1-0.7 Mbps, using the H.264 standard. The profiles generated by the encoder 140C may be different from the profiles generated by the encoder 140A and/or encoder 140B. For example, encoder 140C does not generate profiles having resolutions of 1080p, 576p, or 432p, whereas encoder 140A does generate profiles having resolutions of 1080p, 576p, and 432p. Similarly, profiles generated by encoder 140A and encoder 140C are not the same, as encoder 140B does not generate a profile having resolutions of 720p, whereas encoder 140C does. As such, the resolutions and bitrates generated by the encoders 140A-C may vary from each other and may not be the same.

In some aspects, the cloud-based encoders 140A-N may each be configured to fragment, segment, or divide each respective profile into individual files (e.g., segments). Each segment may be configured to be individually decodable without requiring data from a previous or subsequent segment to start decoding a particular segment. For example, for encoded video data 145A comprising an H.264 video stream generated by encoder 140A, the segments for each profile of the plurality of profiles (e.g., first, second, third, fourth, fifth, sixth, and seventh profiles generated by encoder 140A) may comprise a few seconds of the content. In this example, such segments may each have a duration of about 2-30 seconds, and may typically have a duration of about 4-10 seconds.

In some aspects, each cloud-based encoder 140A-N may further be configured to generate a manifest that identifies the respective individual segments generated by the respective encoder 140A-N, organized or listed in a particular order or sequence, to ensure proper playback or reading of the segmented and encoded video data 145A-N. Each cloud-based encoder 140A-N may further be configured to generate a high-level manifest that identifies the respective profiles and their characteristics (e.g., resolution, bitrate) generated by the respective encoder 140A-N. The manifests may comprise text files that are included in the respective encoded video data 145A-N.

In one aspect, the cloud-based encoders 140A-N may each be configured to receive requests for content or video stream from clients 150A-N connected to the system 100. In response to receiving the request, the encoder 140A-N receiving the request may serve the requested content to the requesting client 150A-N. For example, after a client 150A-N requests content from a particular encoder 140A-N, the encoder 140A-N receiving the request may deliver to the requesting client 150A-N the manifests and/or content through encoded video data 145A-N, which may include the high-level manifest. The requesting client 150A-N may read the high-level manifest to determine the available profiles provided and generated by the encoder 140A-N. The requesting client 150A-N may then select one profile from the list of available profiles, read the selected profile's manifest, request the corresponding segments (e.g., 2-10 seconds in duration, such as a plurality of video frames of a given scene) from the encoder 140A-N, and begin decoding the corresponding segments using hardware or software available to the client 150A-N.

For example, referring to FIG. 1, the client 150A may request content or a video stream from the encoder 140A. In response to the request for content, the encoder 140A may provide to the client 150A the encoded video data 145A that includes a manifest identifying the profiles available to the client 150A (e.g., a first profile having a resolution of 1080p (1920×1080) and bitrate of about 2-6 Mbps, a second profile having a resolution of 720p (1280×720) and bitrate of about 0.9-3 Mbps, a third profile having a resolution of 576p (1024×576) and bitrate of about 0.6-2 Mbps, a fourth profile having a resolution of 480p (848×480) and bitrate of about 0.4-1.5 Mbps, a fifth profile having a resolution of 432p (768×432) and bitrate of about 0.3-1.3 Mbps, a sixth profile having a resolution of 360p (640×360) and bitrate of about 0.2-1 Mbps, and a seventh profile having a resolution of 240p (424×240) and bitrate of about 0.1-0.7 Mbps). The client 150A may select the second profile (e.g., resolution of 720p (1280×720) and bitrate of about 0.9-3 Mbps), read the manifest for the second profile and request from the encoder 140A the corresponding segments for viewing at the client 150A.

Continuing with the example shown in FIG. 1, the client 150B may request content or a video stream from the encoder 140A. In response to the request for content, the encoder 140A may provide to the client 150B the encoded video data 145A that includes the manifest identifying the profiles available to the client 150B. The client 150B may select the first profile (e.g., resolution of 1080p (1920×1080) and bitrate of about 2-6 Mbps), read the manifest for the first profile and request from the encoder 140A the corresponding segments for viewing at the client 150B.

Continuing with the example shown in FIG. 1, the client 150C may request content or a video stream from the encoder 140C. In response to the request for content, the encoder 140C may provide to the client 150C the encoded video data 145C that includes a manifest identifying the profiles available to the client 150C (e.g., a first profile having a resolution of 720p (1280×720) and bitrate of about 0.9-3 Mbps, a second profile having a resolution of 480p (848×480) and bitrate of about 0.4-1.5 Mbps, a third profile having a resolution of 360p (640×360) and bitrate of about 0.2-1 Mbps, and a fourth profile having a resolution of 240p (424×240) and bitrate of about 0.1-0.7 Mbps). The client 150C may select the second profile (e.g., resolution of 480p (848×480) and bitrate of about 0.4-1.5 Mbps), read the manifest for the second profile and request from the encoder 140C the corresponding segments for viewing at the client 150C.

In one aspect, the profile (e.g., resolution and/or bitrate) may be selected solely by the client 150A-N. In another aspect, if system 100 conditions change, such as the client's 150A-N capabilities, the load on the system 100, and/or the available network bandwidth, the client 150A-N may switch to a higher or lower profile as required. The clients 150A-N may base selection of a particular profile on various parameters and/or observations, including the current (observed/available) bandwidth and the amount of data currently residing in a client buffer. Throughout the duration of a given viewing experience, the client 150A-N may upshift or downshift (e.g., switch to a profile having a higher or lower bitrate) or stay at the same bitrate based on the available bandwidth and buffer conditions, among other factors.

In some aspects, each of the clients 150A-N may be configured to communicate with the viewer data module 160 to provide viewer analytics 155 when receiving the encoded video data 145A-N. By way of non-limiting example, the viewer analytics 155 provided by each client 150A-N may include at least one of a session start time, session end time, client type, operating system, a network connection type, geographic location, available bandwidth, network protocol, screen size, device type, display capabilities, and/or codec capabilities.

The viewer analytics 155 may be collected by the viewer data module 160. The viewer data module 160 may comprise servers, routers, switches, or other network devices for collecting, compiling, and sending data relating to the clients 150A-N to the encoder control module 130. In one aspect, the viewer analytics 155 collected at the viewer data module 160 may be processed and/or reformatted to generate viewership demographics 165. The viewership demographics 165 are transmitted to the encoder control module 130 and may be used by the encoder control module 130 to initiate or terminate a session with the cloud-based encoders 140A-N, as discussed below.

As discussed above, the encoder control module 130 is configured to communicate with each cloud-based encoder 140A-N to intelligently instantiate and/or disconnect individual cloud-based encoders 140A-N based on changing viewership demographics, content schedule, or one or more content characteristics. In some implementations, decreasing viewer counts may trigger the instantiation of additional encoders 140N that are configured to provide encoded video data 145N at reduced resolution and bitrates as compared to existing encoders 140A-C to more economically encode video data 135N for a limited or decreasing numbers of clients 150N (e.g., viewers). Newly instantiated encoders 140N may be concurrently implemented with existing encoders (that are providing encoded video data at higher resolutions and bitrates) in order to ensure adequate streaming quality and continuity before encoder substitutions are fully finalized or realized. In such instances, video data 135N provided to the existing encoders may be redirected to the newly instantiated encoder(s) 140N to provide encoded video data 145N to an increasing subset of clients 150N. Once all clients 150N have been successfully transitioned to the newly instantiated encoders 140N, the high-resolution and high-bitrate encoder(s) may be disconnected to realize reduced computational processing and cost savings based on the reduced computing consumption required by the newly instantiated encoders 140N.

For example, referring to FIG. 1, the encoder control module 130 may instantiate encoder 140B based on viewership demographics 165 received in real-time from the viewer data module 160 that indicate decreasing viewer counts. The encoder control module 130 may initiate a session with encoder 140B by sending an instruction via video data 135B to the encoder 140B. Once initiated, the encoder control module 130 may validate that the encoder 140B is ready to begin encoding video. Once validated, the encoder control module 130 may route the video data 135B to the encoder 140B to enable the encoder 140B to begin generating encoded video data 145B. In one aspect, the encoder 140B generates encoded video data 145B simultaneously with other active encoders 140A, C that are providing encoded video data 145A, C, respectively, at higher resolutions and bitrates (e.g., encoder 140A providing highest resolution of 1080p and encoder 140C providing highest resolution of 720p).

Clients 150A-C may be transitioned to the newly instantiated encoder 140B in subsets to ensure that the quality and performance of the video stream provided by the newly instantiated encoder 140B is acceptable or adequate. As shown in FIG. 1, client 150A is initially receiving encoded video data 145A from the encoder 140A at a resolution of 720p, client 150B is initially receiving encoded video data 145A from the encoder 140A at a resolution of 1080p, and client 150C is initially receiving encoded video data 145C from the encoder 140C at a resolution of 480p. Client 150A may be identified as an initial subset of clients to transition to encoder 140B. During the transition phase, client 150A begins to receive the encoded video data 145B from the encoder 140B at a reduced resolution (e.g., 480p).

The encoder control module 130 confirms or assesses the quality of the transition by processing the viewership demographics 165 or viewer analytics 155 provided by the client 150A to the viewer data module 160. If the data provided to the encoder control module 130 shows, for example, that errors occurred as a result of the transition, the video stream has poor quality, continuity issues, or streaming interruptions, the client 150A may be transitioned back to the encoder 140A and another encoder 140N may be instantiated to attempt another transition. If the data provided to the encoder control module 130 does not indicate issues with video stream quality or continuity, for example, encoder 140A will cease to provide the encoded video data 145A to the client 150A and a second subset of clients is identified for transitioning to the encoder 140B.

The second subset may, for example, include client 150B. During a second transition phase, client 150B begins to receive the encoded video data 145B from the encoder 140B at a reduced resolution (e.g., 480p). Again, the encoder control module 130 confirms or assesses the quality of the transition by processing the viewership demographics 165 or viewer analytics 155 provided by the client 150B to the viewer data module 160. If the data provided to the encoder control module 130 shows, for example, that errors occurred as a result of the transition, the video stream has poor quality, continuity issues, or streaming interruptions, the client 150B may be transitioned back to the encoder 140A and another encoder 140N may be instantiated to attempt another transition. If the data provided to the encoder control module 130 does not indicate issues with video stream quality or continuity, for example, encoder 140A will cease to provide the encoded video data 145A to the client 150B and a third subset of clients is identified for transitioning to the encoder 140B.

The third subset may, for example, include client 150C. During a third transition phase, client 150C begins to receive the encoded video data 145B from the encoder 140B. Again, the encoder control module 130 confirms or assesses the quality of the transition by processing the viewership demographics 165 or viewer analytics 155 provided by the client 150C to the viewer data module 160. If the data provided to the encoder control module 130 shows, for example, that errors occurred as a result of the transition, the video stream has poor quality, continuity issues, or streaming interruptions, the client 150C may be transitioned back to the encoder 140C and another encoder 140N may be instantiated to attempt another transition. If the data provided to the encoder control module 130 does not indicate issues with video stream quality or continuity, for example, encoder 140C will cease to provide the encoded video data 145C to the client 150C and a next subset of clients is identified for transitioning to the encoder 140B until all clients 150N that are connected to the encoders 140A, C are transitioned to the newly instantiated encoder 140B. It is understood that a subset of clients may include any number of clients 150N that is less than the total number of clients connected to existing high-resolution encoders.

New clients 150N that may request content or a video stream during the transitional phase, may be connected to the newly instantiated encoder and not to any existing high-resolution encoders that are in the process of being phased out or disconnected.

Once all clients 150A-C have been successfully transitioned to the encoder 140B, the encoder control module 130 may disconnect or otherwise terminate the sessions with the high-resolution and high-bitrate encoders 140A, C (e.g., encoder 140A providing highest resolution of 1080p and encoder 140C providing highest resolution of 720p) to realize reduced computational processing and cost savings based on the reduced computing consumption required by the encoder 140B (providing highest resolution of 480p). The encoder control module 130 may terminate the encoders 140A, C by disconnecting or discontinuing transmission of the video data 135A, C to each of the encoders 140A, C, respectively.

In some aspect, additional reduced-resolution cloud-based encoders 140N may be instantiated in response to a further change in viewer count, such as a further decrease in viewer count, and may be implemented consistent with the methods described above.

While the example above relates to instantiating reduced-resolution cloud-based encoders and disconnecting individual high-resolution cloud-based encoders based on changing actual or real-time viewer counts, it is also understood that the system 100 may utilize other information to instantiate or disconnect cloud based encoders. For example, the encoder control module 130 may process stored viewership demographics 165 to identify patterns and trends in viewer counts. For example, the encoder control module 130 may determine that a pattern of decreasing viewer count exists where the amount of viewers decrease after significant sporting events. In this example, the encoder control module 130 may utilize content schedule information (e.g., start time, end time, duration, date) contained in the management data 126 to identify an end of a significant sporting event and utilize the past patterns and trends related to viewer counts to predict a change in future viewer counts after the sporting event ends. In such an example, the encoder control module 130 may begin transitioning clients 150A-N onto reduced resolution cloud-based encoders as soon as a sporting event ends. The encoder control module 130 may then monitor viewership demographics 165 to confirm that the system 100 is indeed experiencing reduced viewer counts. In the event the system 100 does realize reduced viewer counts, the encoder control module 130 may continue to transition clients 150A-N onto the reduced-resolution cloud-based encoder. If the system 100 does not realize the predicted reduction in viewer count, then the encoder control module 130 may maintain the higher-resolution cloud-based encoder(s) until an actual reduction in viewer count is realized.

In another example, the encoder control module 130 may identify decreased viewer counts based on one or more content characteristics (e.g., content type, rating) for the content associated with the video stream. In this example, the encoder control module 130 may identify content in the video stream that comprises an infomercial based on information contained in the management data 126 to predict a future decrease in viewer counts. In such an example, the encoder control module 130 may begin transitioning clients 150A-N onto reduced resolution cloud-based encoders when the infomercial begins streaming to clients 150A-N. The encoder control module 130 may then monitor viewership demographics 165 to confirm that the system 100 is indeed experiencing reduced viewer counts for the infomercial. In the event the system 100 does realize reduced viewer counts, the encoder control module 130 may continue to transition clients 150A-N onto the reduced-resolution cloud-based encoder. If the system 100 does not realize the predicted reduction in viewer count, then the encoder control module 130 may maintain the higher-resolution cloud-based encoder(s) until an actual reduction in viewer count is realized.

In other implementations, additional cloud-based encoders 140N may be required to provide higher-resolution and higher-bitrate encoding, for example, where increased video stream resolutions are desired for an increasing number of clients 150N. In such implementations, the encoder control module 130 may detect increases in viewer count that may trigger the instantiation of additional encoders 140N. The newly instantiated higher resolution cloud-based encoders 140N may be instantiated concurrently with existing (relatively lower resolution and bitrate) encoders. Similar to the above example, transitioning of clients 150N to thereby receive streaming video from the newly instantiated encoder(s) 140N can be gradual. That is, increasing subsets of clients 150N can be provided video streams sourced from the new encoder(s) 140N as video quality and continuity is verified.

Figure 2:
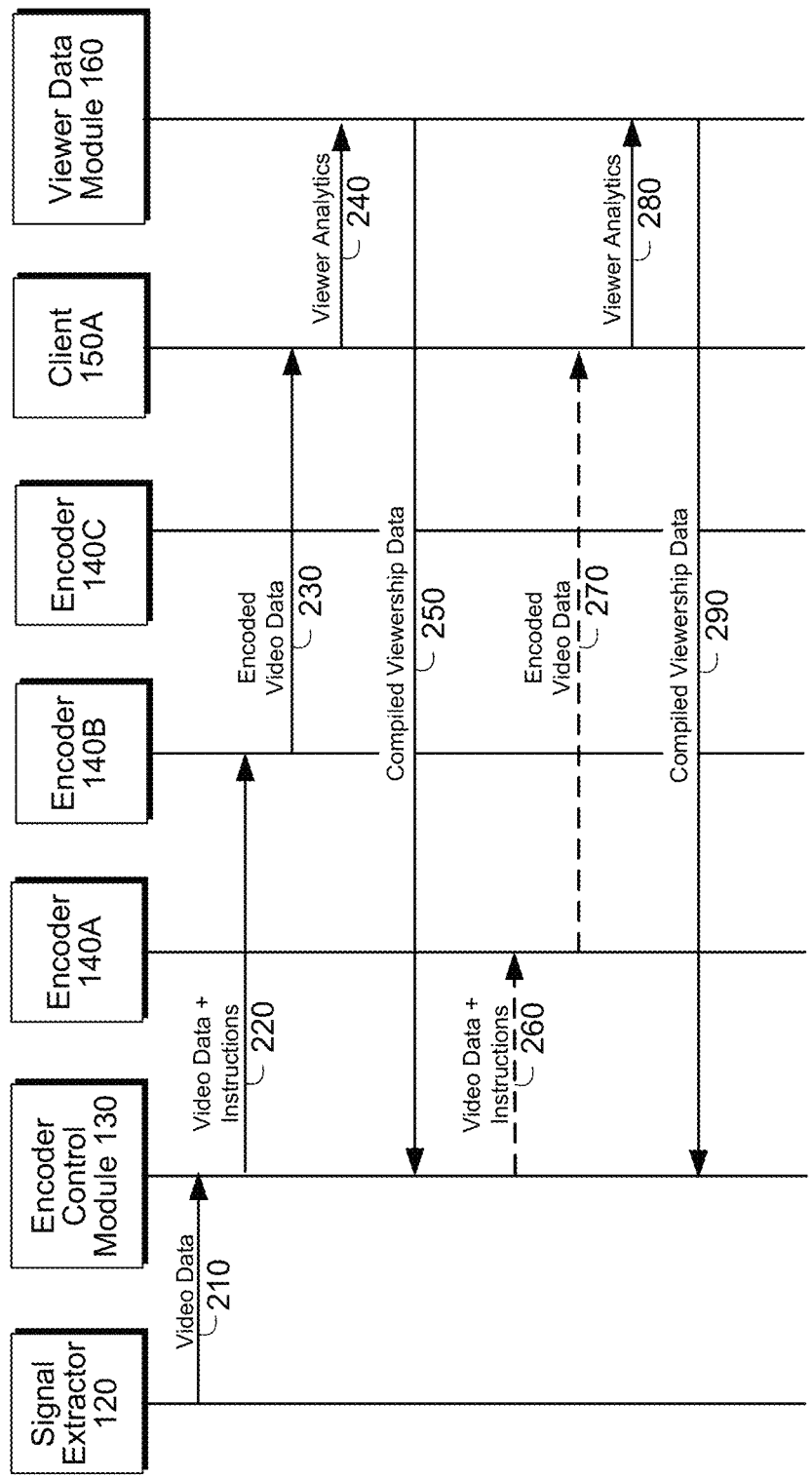
FIG. 2 depicts a sequence diagram showing the communications between a signal extractor, encoder control module, encoder, client, and viewer data module, in accordance with various aspects of the subject technology.

FIG. 2 depicts a sequence diagram 200 relating to instantiating higher-resolution cloud-based encoders based on increased viewer count and shows communications between the signal extractor 120, encoder control module 130, encoders 140A-C, client 150A, and viewer data module 160, in accordance with various aspects of the subject technology. Additional, different, or fewer acts may be provided. For example, acts for any one of the devices (e.g., signal extractor 120, encoder control module 130, encoders 140A-C, client 150A, and viewer data module 160) are performed with or without the other devices performing acts. In yet another example, processing, routing, or other networking acts are performed in addition to the acts shown in FIG. 2. The acts may be performed in the order shown. The order is listed in numerical sequence and/or from top to bottom in FIG. 2. In alternative aspects, the acts may be performed in other orders.

Referring to FIG. 2, a sequence diagram 200 is illustrated showing that the signal extractor 120 performs acts 210. The encoder control module 130 performs acts 210, 220, 250, 260 and 290. The encoder 140A performs acts 260 and 270. The encoder 140B performs acts 220 and 230. The client 150A performs acts 230, 240, 270, and 280. The viewer data module 160 performs acts 240, 250, 280 and 290. Other devices may perform any one or more of the acts, such as a different server or module. Any of the acts may involve operations by more than one component, such as the routing of video data to and from the encoder control module 130.

In act 210, the signal extractor 120 routes an incoming stream (e.g., video data) to the encoder control module 130. The video data may include a video stream. In act 220, the encoder control module 130 routes the video data to the encoder 140B. The video data may include instructions directed to the encoder 140B, as discussed above. In act 230, the encoder 140B generates encoded video data (e.g., video stream with a plurality of profiles) from the video data received from the encoder control module 130. The encoded video data from the encoder 140B is provided to the client 150A. In act 240, the client 150A receives the encoded video data and reports viewer analytics to the viewer data module 160. In act 250, the viewer data module 160 transmits the viewer data collected from the client 150A to the encoder control module 130.

In act 260, the encoder control module 130 may instantiate encoder 140A based on viewership demographics received in real-time from the viewer data module 160 that indicate increasing viewer counts. The encoder control module 130 may initiate a session with encoder 140A by sending an instruction via video data to the encoder 140A. Once initiated, the encoder control module 130 may validate that the encoder 140A is ready to begin encoding video. Once validated, the encoder control module 130 may route the video data to the encoder 140A to enable the encoder 140A to begin generating higher resolution encoded video data (e.g., video streams having resolution of 1080p, 720p, 576p). In act 270, the encoder 140A generates higher resolution and higher bitrate encoded video data simultaneously with other active encoders 140B that are providing encoded video data at lower resolutions and bitrates (e.g., video streams having resolution of 480p, 360p, and 240p).

Client 150A may be transitioned to the newly instantiated encoder 140A in subsets to ensure that the quality and performance of the video stream provided by the newly instantiated encoder 140A is acceptable or adequate. Client 150A may initially receive encoded video data from the encoder 140B at a resolution of 240p. Client 150A may also be identified as an initial subset of clients to transition to encoder 140A. During the transition phase, client 150A begins to receive the higher resolution encoded video data from the encoder 140A at a higher resolution (e.g., 1080p).

In act 280, the client 150A receives the encoded video data from encoder 140A and reports viewer analytics to the viewer data module 160. In act 290, the viewer data module 160 transmits the viewer data collected from the client 150A to the encoder control module 130.

The encoder control module 130 confirms or assesses the quality of the transition by processing the viewer data provided by the client 150A. If the data provided to the encoder control module 130 shows, for example, that errors occurred as a result of the transition, the video stream has poor quality, continuity issues, or streaming interruptions, the client 150A may be transitioned back to the encoder 140B and another encoder may be instantiated to attempt another transition. If the data provided to the encoder control module 130 from the client 150A does not indicate issues with video stream quality or continuity, for example, encoder 140B will cease to provide the encoded video data to the client 150A and a second subset of clients may be identified for transitioning to the encoder 140A. As described above, additional subsets of clients may be gradually transitioned from lower-resolution encoders to higher-resolution encoders, as desired.

New clients 150N that may request content or a video stream during the transitional phase, may be connected to the newly instantiated encoder and not to any existing lower-resolution encoders.

Once encoder 140A is operational and providing video streams to clients, the encoder control module 130 may disconnect or otherwise terminate the sessions with the lower-resolution and lower-bitrate encoders 140B by disconnecting or discontinuing transmission of the video data to the lower-resolution encoder 140B.

In some aspect, additional higher-resolution cloud-based encoders 140N may be instantiated in response to a further change in viewer count, such as a further increase in viewer count, and may be implemented consistent with the methods described above.

While the example above relates to instantiating higher-resolution cloud-based encoders based on changing actual or real-time viewer counts, it is also understood that the system 100 may utilize other information to instantiate cloud based encoders. For example, the encoder control module 130 may process stored viewership demographics 165 to identify patterns and trends in viewer counts. For example, the encoder control module 130 may determine that a pattern of increasing viewer count exists where the amount of viewers increases near the start of a significant sporting event. In this example, the encoder control module 130 may utilize content schedule information (e.g., start time, end time, duration, date) contained in the management data 126 to identify a start of a significant sporting event and utilize the past patterns and trends related to viewer counts to predict a change in future viewer counts. In such an example, the encoder control module 130 may begin instantiating higher-resolution cloud-based encoders at the time a sporting event begins on the video stream. The encoder control module 130 may then monitor viewership demographics 165 to confirm that the system 100 is indeed experiencing increased viewer counts. In the event the system 100 does realize increased viewer counts, the encoder control module 130 may limit the number of higher-resolution cloud-based encoders until an actual increase of viewership is realized.

In another example, the encoder control module 130 may identify increase viewer counts based on one or more content characteristics (e.g., content type, rating) for the content associated with the video stream. In this example, the encoder control module 130 may identify content in the video stream that comprises an award show based on information contained in the management data 126 to predict a future increase in viewer counts. In such an example, the encoder control module 130 may begin instantiating higher-resolution cloud-based encoders at the time the award show begins streaming to clients. The encoder control module 130 may then monitor viewership demographics 165 to confirm that the system 100 is indeed experiencing increased viewer counts for the award show. In the event the system 100 does realize increased viewer counts, the encoder control module 130 may limit the number of higher-resolution cloud-based encoders until an actual increase of viewership is realized.

The cloud-based encoders 140A-N convert or transcode the received video data 135A-N to a required format using a cloud-based facility. In one aspect, by utilizing the cloud-based encoders 140A-N to transcode the video data 135A-N, transcoding of the video data 135A-N may be performed with minimal infrastructure costs when compared to conventional in-house video encoding/transcoding systems that utilize in-house servers and resources. In another aspect, by using cloud-based encoders 140A-N to transcode the video data 135A-N, an encoding capacity of the system 100 may be dynamically scaled based on demand, content schedule, or one or more content characteristics.

According to the system 100 described above, the incoming signal 115 may be received by the signal extractor 120. The signal extractor 120 may process the incoming signal 115 to identify markers 122 and/or management data 126. The incoming signal 115 or video data 124 is received by the encoder control module 130. The encoder control module 130 may dynamically and intelligently instantiate or disconnect individual cloud-based encoders 140A-N based on changing viewership demographics, content schedule, or one or more content characteristics. The cloud-based encoders 140A-N transcode the incoming signal 115 or video data 135A-N into a plurality of profiles having different resolutions and bitrates. The clients 150A-N may request content from the encoders 140A-N and select the appropriate profile of content to display or play at the client 150A-N. The clients 150A-N provide viewer analytics to the viewer data module 160 for use by the encoder control module 130 as described above.

The various components of the system 100 are configured by hardware and/or software to receive content from a remote content source, decode video, encode video using cloud-based encoders, request content, serve content, collect viewership analytics, and/or combinations thereof. Logic is encoded in one or more non-transitory computer-readable media for operating the clients 150A-N, the components of the signal extractor 120, advertisement placement opportunity module 125, encoder control module 130, encoders 140A-N, and viewer data module 160. The logic includes code for execution by a processor or processors. When executed by a processor, the code is used to perform operations for extracting data via the signal extractor 120, instantiating or disconnecting cloud-based encoders via the encoder control module 130 based on changing viewership demographics, content, or schedule, encoding video via the encoders 140A-N, requesting content from the encoders 140A-N, and collecting viewership analytics via the viewer data module 160.

Figure 3:
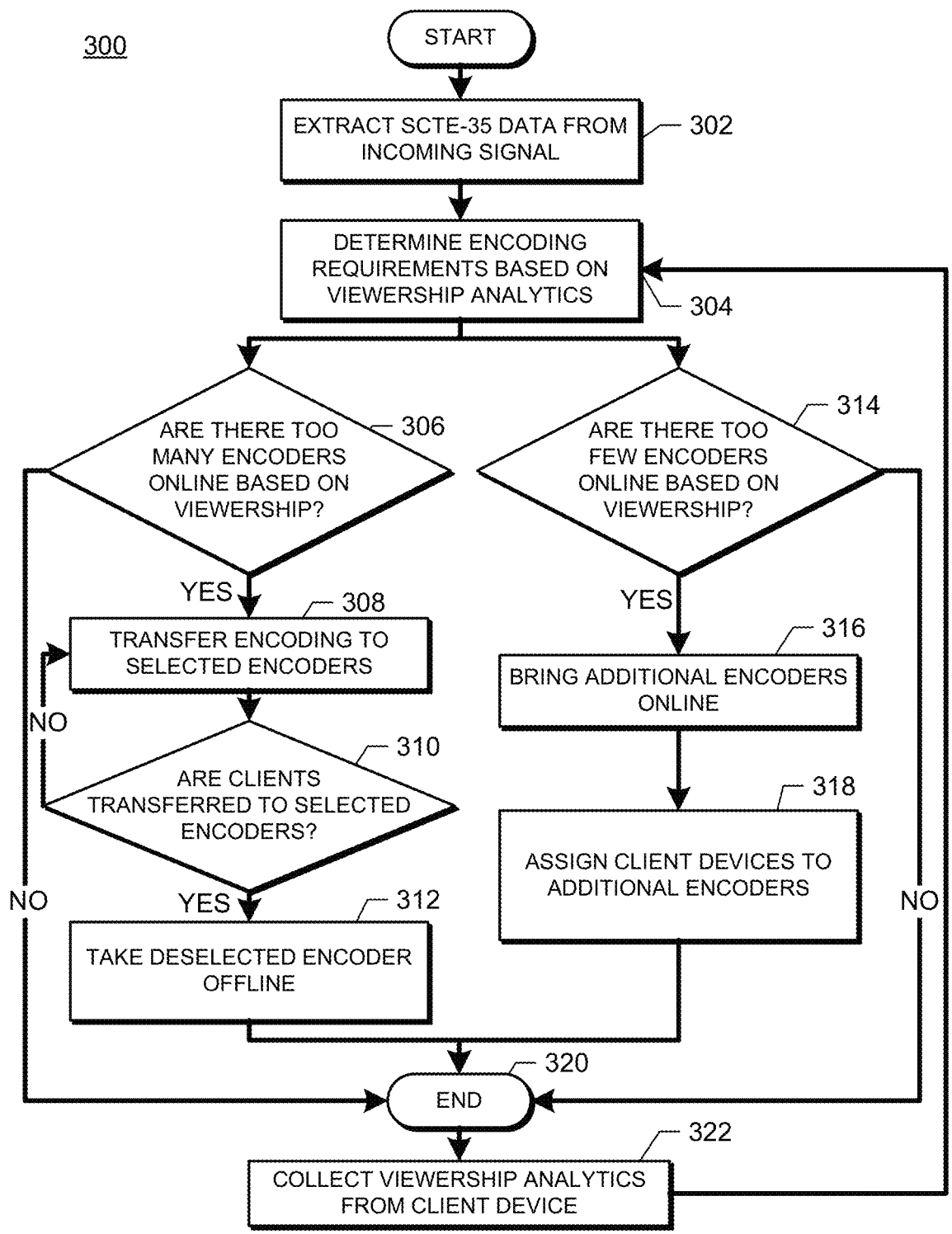
FIG. 3 depicts an example method for providing adaptive video encoding, in accordance with various aspects of the subject technology.

FIG. 3 depicts an example method 300 for providing adaptive video encoding, in accordance with various aspects of the subject technology. It should be understood that, for any process discussed herein, there can be additional, fewer, or alternative steps performed in similar or alternative orders, or in parallel, within the scope of the various aspects unless otherwise stated. The method 300 can be performed by a network, and particularly, an adaptive encoding system (e.g., the system 100 of FIG. 1) or similar system.

At operation 302, data (e.g., SCTE-35 data) is extracted from an incoming signal representing a video stream. The incoming signal may be received from a remote content source or provider and may be transmitted or broadcasted. The incoming signal may comprise data compressed in one or more video compression formats, such as H.265, H.264, MPEG-H, MPEG-4, and/or MPEG-2. At operation 304, after the incoming signal is received and extracted, an encoder control module (e.g., encoder control module 130 from FIG. 1) may determine encoding demands or requirements based on viewership analytics received from downstream client devices (e.g., clients 150A-N from FIG. 1).

At operation 306, it is determined whether there are too many cloud-based encoders encoding video streams based on current viewership or demand. If the encoding capacity provided by the cloud-based encoders is sufficient, no change in encoding capacity is made and the routine ends at operation 320. If there is excess encoding capacity provided by the cloud-based encoders, then at operation 308 clients are transferred to reduced-resolution encoders. As described above, clients may be transferred in subsets to ensure that clients transferred to the reduced-resolution encoders do not experience video streaming quality issues. At operation 310, it is determined whether there are any remaining clients connected to higher-resolution encoders. If so, the transfer process continues at operation 308. If all clients previously connected to higher-resolution encoders have been transferred to reduced-resolution encoders, then at operation 312 the higher-resolution encoders are disconnected and taken offline.

At operation 314, it is determined whether there are too few cloud-based encoders encoding video streams based on current viewership or demand. If the encoding capacity provided by the cloud-based encoders is sufficient, no change in encoding capacity is made and the routine ends at operation 320. If there is insufficient encoding capacity provided by the cloud-based encoders, then at operation 316 additional cloud-based encoders are instantiated to satisfy demand. At operation 318, after the newly instantiated encoders are online, clients may begin receiving video streams from the newly instantiated encoders thereby satisfying viewer demand. After demand is satisfied based on the additional encoders, the routine ends at operation 320.

At operation 322, viewership analytics from the client devices is collected and used by operation 304 to determine whether current encoding capacity is sufficient or insufficient based on current viewer demand. If there is excessive capacity, then the process continues to operation 306, as described above If there is insufficient capacity, then the process continues to operation 314, as described above.

Figure 4:
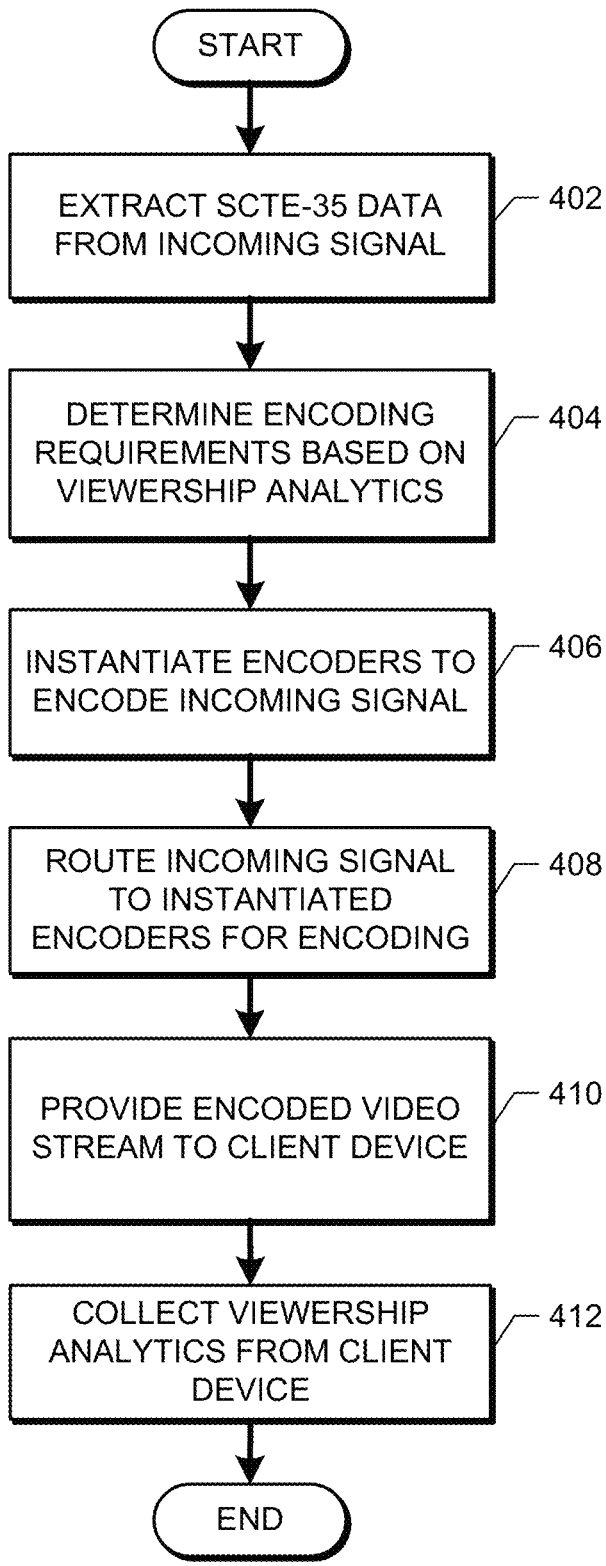
FIG. 4 depicts an example method for providing adaptive video encoding, in accordance with various aspects of the subject technology.

FIG. 4 depicts an example method 400 for providing adaptive video encoding, in accordance with various aspects of the subject technology. It should be understood that, for any process discussed herein, there can be additional, fewer, or alternative steps performed in similar or alternative orders, or in parallel, within the scope of the various aspects unless otherwise stated. The method 400 can be performed by a network, and particularly, an adaptive encoding system (e.g., the system 100 of FIG. 1) or similar system.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include extracting data from an incoming signal. The extracted data may be SCTE-35 data included in an incoming video stream signal generated by a remote content source or provider. An operation 404 may include determining encoding requirements for a platform based on viewership analytics. As described above, the determination may be based on viewership (actual or predicted), schedule of the content associated with the video stream, or one or more characteristics associated with content in the video stream. An operation 406 may include instantiating cloud-based encoders to satisfy encoding requirements and/or viewer demand determined at operation 404. As described above, a declining viewer count may lead to overcapacity in encoding capacity, thereby causing a system (e.g., system 100 of FIG. 1) to instantiate encoders with reduced-resolution video streams to realize computational processing and cost savings based on the reduced computing consumption required by the newly instantiated encoders. Alternatively, an increasing viewer count may lead to under capacity in encoding capacity, thereby causing a system (e.g., system 100 of FIG. 1) to instantiate encoders with higher-resolution video streams to satisfy viewer demand.

An operation 408 may include routing the incoming signal to the instantiated encoders for encoding of the incoming signal. An operation 410 may include providing the encoded video stream to a client device. An operation 412 may include collecting viewership analytics from the client device receiving the encoded video stream.

Figure 5:
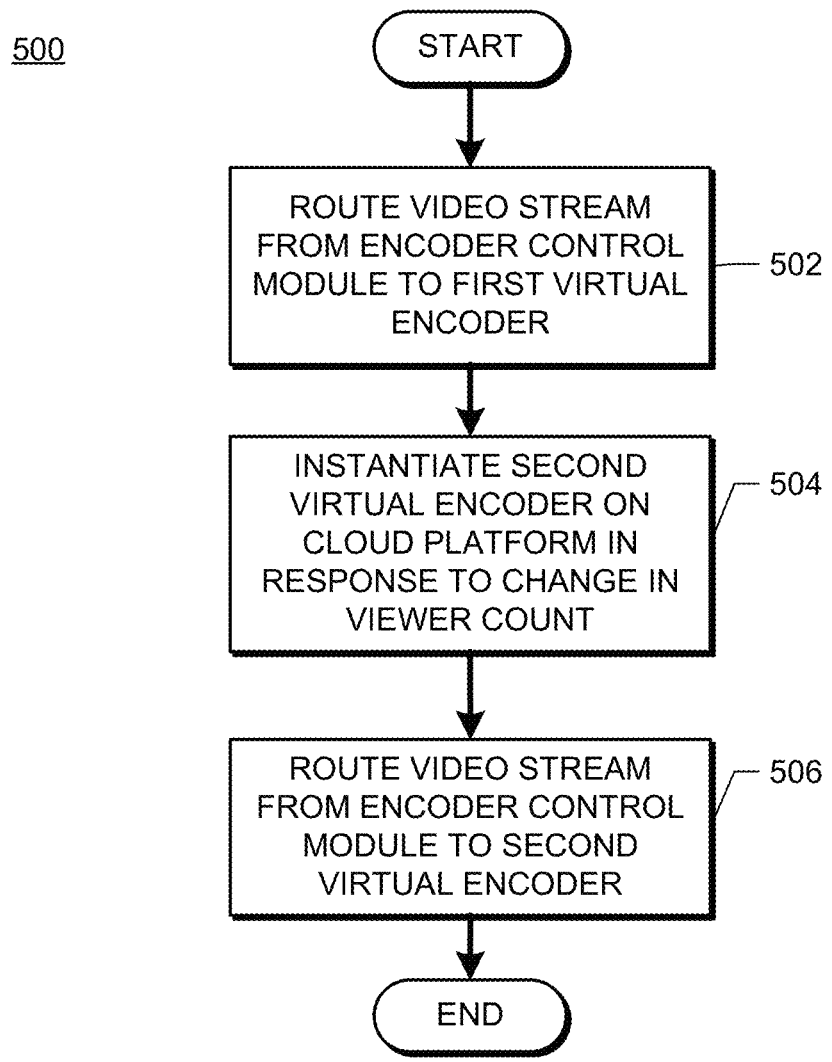
FIG. 5 depicts an example method for providing adaptive video encoding, in accordance with various aspects of the subject technology.

FIG. 5 depicts an example method 500 for providing adaptive video encoding, in accordance with various aspects of the subject technology. It should be understood that, for any process discussed herein, there can be additional, fewer, or alternative steps performed in similar or alternative orders, or in parallel, within the scope of the various aspects unless otherwise stated. The method 500 can be performed by a network, and particularly, an adaptive encoding system (e.g., the system 100 of FIG. 1) or similar system.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 may include routing a video stream from an encoder control module (e.g., encoder control module 130 from FIG. 1) to a first virtual encoder. The first virtual encoder may be instantiated on a cloud platform and configured to provide a first video output at a first bitrate. Operation 502 may be performed by one or more hardware processors configured by machine-readable instructions including a module that is the same as or similar encoder 140A-N, in accordance with one or more implementations.

An operation 504 may include instantiating a second virtual encoder on the cloud platform in response to a change in viewer count. Operation 504 may be performed by one or more hardware processors configured by machine-readable instructions including a module that is the same as or similar to encoder control module 130, in accordance with one or more implementations.

An operation 506 may include routing the video stream from the encoder control module to the second virtual encoder. The second virtual encoder may be configured to provide a second video output at a second bitrate. The second bitrate may be different from the first bitrate. Operation 506 may be performed by one or more hardware processors configured by machine-readable instructions including a module that is the same as or similar to encoder control module 130, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 6:
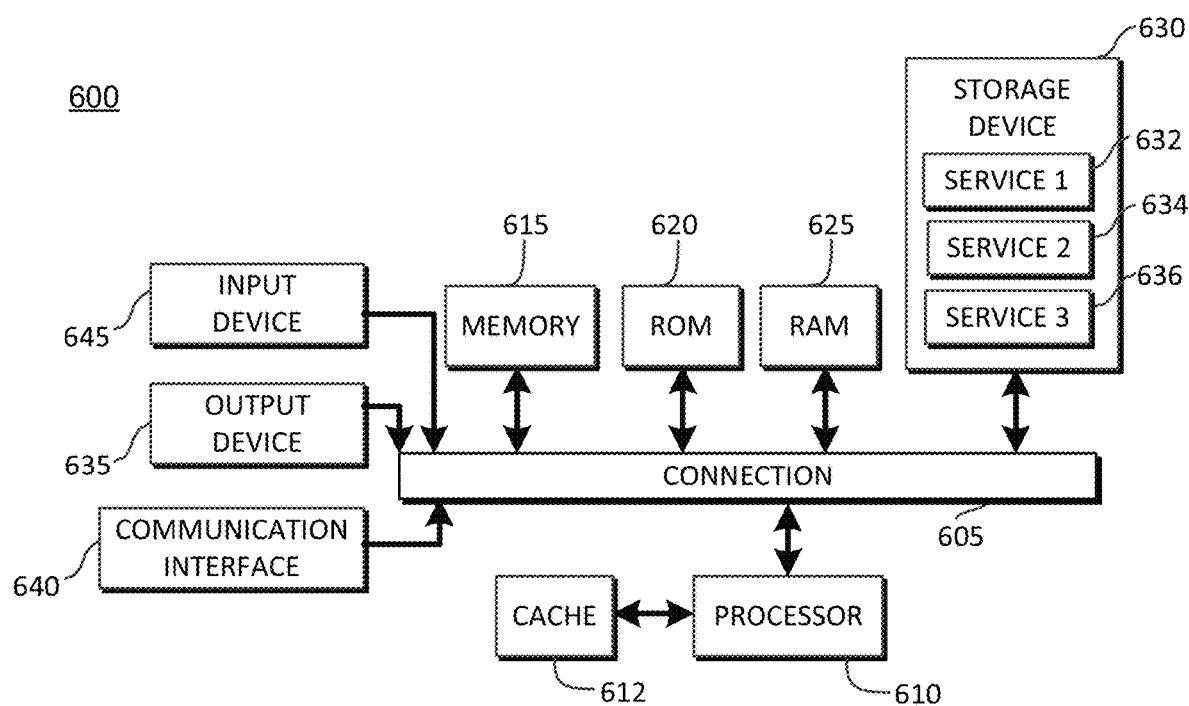
FIG. 6 illustrates an example of a system configured for providing adaptive video encoding, in accordance with some aspects.

FIG. 6 depicts an example of a computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

System 600 includes at least one processing unit (CPU or processor) 610 and connection 605 that couples various system components including system memory 615, such as read only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

It will be appreciated that computing system 600 can have more than one processor 610, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, the term "module" may refer to any component or set of components that perform the functionality attributed to the module. This may include one or more physical processors during execution of processor readable instructions, the processor readable instructions, circuitry, hardware, storage media, or any other components.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for providing adaptive video encoding, comprising:
   routing a video stream to a first virtual encoder, wherein the first virtual encoder is instantiated on a cloud platform and configured to provide a first video output associated with a first plurality of profiles;
   instantiating a second virtual encoder on the cloud platform in response to a decrease in viewer count; and
   routing the video stream to the second virtual encoder, wherein the second virtual encoder is configured to provide a second video output associated with a second plurality of profiles, wherein a number of profiles of the second plurality of profiles is less than a number of profiles of the first plurality of profiles.

2. The computer-implemented method of claim 1, wherein instantiating the second virtual encoder is further based on a predicted decrease in viewer count.

3. The computer-implemented method of claim 1, further comprising:
   transitioning a subset of client devices of a plurality of client devices connected to the first virtual encoder, to the second virtual encoder;
   confirming the subset of client devices receive the second video output from the second virtual encoder; and transitioning a remaining set of client devices of the plurality of client devices connected to the first virtual encoder, to the second virtual encoder, wherein the remaining set of client devices do not include client devices from the first subset of client devices.

4. The computer-implemented method of claim 3, further comprising disconnecting the video stream from the first virtual encoder after the remaining set of client devices of the plurality of client devices are connected to the second virtual encoder.

5. The computer-implemented method of claim 1, further comprising instantiating a third virtual encoder on the cloud platform in response to a change in viewer count.

6. The computer-implemented method of claim 1, further comprising collecting viewer data from a client device receiving the second video output.

7. The computer-implemented method of claim 6, wherein the viewer data comprises at least one of a device type, an operating system, a network connection and a geographic location of the client device.

8. A non-transitory computer-readable medium comprising instructions stored therein, the instructions, when executed by a computing system, cause the computing system to:
route a video stream to a first virtual encoder, wherein the first virtual encoder is instantiated on a cloud platform and configured to provide a first video output associated with a first plurality of profiles;
instantiate a second virtual encoder on the cloud platform in response to a decrease in viewer count; and
route the video stream to the second virtual encoder, wherein the second virtual encoder is configured to provide a second video output associated with a second plurality of profiles, wherein a number of profiles of the second plurality of profiles is less than a number of profiles of the first plurality of profiles.

9. The non-transitory computer-readable medium of claim 8, wherein the instructions further cause the computing system to instantiate the second virtual encoder based on a predicted decrease in viewer count.

10. The non-transitory computer-readable medium of claim 8, wherein the instructions further cause the computing system to:
transition a subset of client devices of a plurality of client devices connected to the first virtual encoder, to the second virtual encoder;
confirm the subset of client devices receive the second video output from the second virtual encoder; and
transition a remaining set of client devices of the plurality of client devices connected to the first virtual encoder, to the second virtual encoder, wherein the remaining set of client devices do not include client devices from the first subset of client devices.

11. The non-transitory computer-readable medium of claim 10, wherein the instructions further cause the computing system to disconnect the video stream from the first virtual encoder after the remaining set of client devices of the plurality of client devices are connected to the second virtual encoder.

12. The non-transitory computer-readable medium of claim 8, wherein the instructions further cause the computing system to instantiate a third virtual encoder on the cloud platform in response to a change in viewer count.

13. The non-transitory computer-readable medium of claim 8, wherein the instructions further cause the computing system to collect viewer data from a client device receiving the second video output.

14. The non-transitory computer-readable medium of claim 13, wherein the viewer data comprises at least one of a device type, an operating system, a network connection and a geographic location of the client device.

15. A system comprising:
a processor; and
a non-transitory computer-readable medium storing instructions that, when executed by the system, cause the processor to:
route a video stream to a first virtual encoder, wherein the first virtual encoder is instantiated on a cloud platform and configured to provide a first video output associated with a first plurality of profiles;
instantiate a second virtual encoder on the cloud platform in response to a decrease in viewer count; and
route the video stream to the second virtual encoder, wherein the second virtual encoder is configured to provide a second video output associated with a second plurality of profiles, wherein a number of profiles of the second plurality of profiles is less than a number of profiles of the first plurality of profiles.

16. The system of claim 15, wherein the instructions further cause the system to instantiate the second virtual encoder based on a predicted decrease in viewer count.

17. The system of claim 15, wherein the instructions further cause the system to:
transition a subset of client devices of a plurality of client devices connected to the first virtual encoder, to the second virtual encoder;
confirm the subset of client devices receive the second video output from the second virtual encoder; and
transition a remaining set of client devices of the plurality of client devices connected to the first virtual encoder, to the second virtual encoder, wherein the remaining set of client devices do not include client devices from the first subset of client devices.

18. The system of claim 17, wherein the instructions further cause the system to disconnect the video stream from the first virtual encoder after the remaining set of client devices of the plurality of client devices are connected to the second virtual encoder.

19. The system of claim 15, wherein the instructions further cause the system to collect viewer data from a client device receiving the second video output.

20. The system of claim 19, wherein the viewer data comprises at least one of a device type, an operating system, a network connection and a geographic location of the client device.

* * * * *